United States Patent Office 3,337,308
Patented Aug. 22, 1967

3,337,308
PREPARATION OF LITHIUM ALUMINUM HYDRIDE
Ralph G. Verdieck, Havertown, and Oscar Francis Beumel, Jr., West Chester, Pa., assignors to Foote Mineral Company, Exton, Pa., a corporation of Pennsylvania
No Drawing. Filed Feb. 19, 1964, Ser. No. 345,853
8 Claims. (Cl. 23—365)

The present invention relates to a novel method for making lithium aluminum hydride; and, more particularly, it relates to a novel one-step method for making lithium aluminum hydride in high yield and considerable savings in cost.

The classical method of making lithium aluminum hydride has been to react four moles of lithium hydride with one mole of aluminum chloride in accordance with the equation:

(I)     $4LiH + AlCl_3 \rightarrow LiAlH_4 + 3LiCl$

It will be noted that this reaction results in the formation of three moles of lithium chloride, as by-product, for each four moles of lithium hydride reactant employed. Lithium hydride is a relatively expensive material, and the lithium chloride by-product, from the foregoing reaction, is nearly worthless due to contamination.

In an effort to reduce the relative proportion of lithium hydride required per mole of lithium aluminum hydride produced, a "two-step" process has been suggested in Patent No. 2,920,935. According to the process of this patent, three moles of sodium aluminum hydride are reacted with one mole of aluminum chloride to provide four moles of aluminum hydride and three moles of sodium chloride; following the separation of the sodium chloride from the aluminum hydride, the latter is reacted with lithium hydride to form lithium aluminum hydride. This process is set forth in the following equations:

(II)    $3NaAlH_4 + AlCl_3 \rightarrow 4AlH_3 + 3NaCl$ (III)   $4AlH_3 + 4LiH \rightarrow 4LiAlH_4$ The initial sodium aluminum hydride, when prepared from sodium hydride and aluminum chloride, requires the following equation:

(IV)    $4NaH + AlCl_3 \rightarrow NaAlH_4 + 3NaCl$

It will be seen, therefore, that, according to the method of this patent, three steps are actually required when the starting materials available are sodium hydride (NaH), lithium hydride (LiH) and aluminum chloride ($AlCl_3$).

It is the principal object of the present invention to provide a novel process for preparing lithium aluminum hydride.

It is another object of the present invention to provide a simple, one-step process for preparing lithium aluminum hydride from lithium hydride, sodium hydride and aluminum chloride.

It is a further object of the present invention to provide a novel process for preparing lithium aluminum hydride which, while requiring only a single step, involves replacing three moles of lithium hydride (in Equation I above) with three moles of sodium hydride whereby the alkali metal chloride by-product is essentially sodium chloride.

These and other objects will become apparent from a consideration of the following specification and the claims.

The novel method for preparing lithium aluminum hydride according to the present invention comprises reacting, in tetrahydrofuran, lithium hydride, sodium hydride and aluminum chloride, in a mole ratio of essentially 1:3:1 according to the equation:

(V)     $LiH + 3NaH + AlCl_3 \rightarrow LiAlH_4 + 3NaCl$

The method of the present invention represents many important advantages over prior procedures for preparing lithium aluminum hydride. As compared to the classical reaction (I), the present method permits the use of only one mole of lithium hydride for each mole of lithium aluminum hydride produced, while the contaminated by-product is the relatively inexpensive sodium chloride. As compared to the procedure of Patent No. 2,920,935, the present method is markedly less complicated and time-consuming. Aside from the obvious advantage of a simple one-step procedure over a three-step procedure, it will be noted that the present process requires but one separation of sodium chloride whereas the procedure of the patent requires two separations thereof.

In carrying out the present method, the reaction medium will be tetrahydrofuran. Aluminum chloride is freely soluble in tetrahydrofuran, while lithium and sodium hydrides are only sparingly soluble therein. The primary reaction product, lithium aluminum hydride, is soluble in tetrahydrofuran while the by-product, sodium chloride, precipitates therefrom. Thus, the amount of tetrahydrofuran employed may vary widely so long as a workable slurry is provided for conducting the reaction and for removing the sodium chloride. Since moisture is detrimental to the reaction, the tetrahydrofuran should be substantially anhydrous. For the same reason, ordinary air should be excluded from the reaction. While completely dry air might be employed, it is preferred that a non-oxygen-containing atmosphere be used, such as one of the common inert gases like nitrogen, helium, argon, and the like.

In accordance with the broader aspects of the invention, the three reactants are simply combined and mixed in the tetrahydrofuran. In a preferred embodiment, the sodium hydride and the lithium hydride are first added to a portion of the tetrahydrofuran to form a slurry, following which a solution of the aluminum chloride in the remainder of the tetrahydrofuran is mixed therewith.

The reaction is exothermic so that, upon mixing the reactants, the temperature rises. Unless cooling means are employed, the temperature will rise to reflux, and the temperature is advantageously maintained at reflux through the application of heat from an external source. While refluxing is preferred, it is not essential, and the reaction may take place at lower temperatures, even down to room temperature, if time is not of great importance.

Following completion of the reaction, the sodium chloride can be removed from the reaction mixture, as by filtration. The lithium aluminum hydride, which remains in solution in the tetrahydrofuran, can be permitted to stay in solution therein since such a solution is a convenient way of handling and storing the lithium aluminum hydride. If it is desired to recover the lithium aluminum hydride as such, this can be accomplished through evaporation of the tetrahydrofuran.

The practice of the invention will be more readily understood from a consideration of the following specific example which is given for the purpose of illustration only and is not intended to limit the scope of the invention in any way.

EXAMPLE I

There are placed in a reaction vessel, 116.9 g. (4.87 moles) of sodium hydride, 12.6 g. (1.58 moles) of lithium hydride and 200 ml. of tetrahydrofuran. The air in the reaction vessel is flushed out with argon gas, and an argon gas atmosphere is maintained in the reaction vessel during the reaction. A solution of 200 g. (1.50 moles) of aluminum chloride in 1,000 ml. of tetrahydrofuran is then added over a period of ten minutes. Upon addition of the aluminum chloride solution, the temperature of the mixture rises quickly to reflux and is maintained there by external heating for four hours. At the end of that time the solution is analyzed and is found to have present essentially a quantitative yield of lithium hydride with only a trace of sodium remaining in the solution.

Modification is possible in the selection of materials, including reaction media equivalent to tetrahydrofuran, as well as in the exact procedures and techniques employed without departing from the scope of the invention.

What is claimed is:

1. The method for preparing lithium aluminum hydride which comprises reacting, in tetrahydrofuran, lithium hydride, sodium hydride and aluminum chloride in a mole ratio of substantially 1:3:1.
2. The method of claim 1 wherein the reaction is conducted under an inert gas atmosphere.
3. The method of claim 1 wherein the reaction is conducted at a temperature from about room temperature to reflux.
4. The method of claim 1 wherein the reaction is conducted substantially at the reflux.
5. The method of claim 1 wherein the reaction is conducted under an inert gas atmosphere, and wherein the reaction is conducted substantially at the reflux.
6. The method of claim 1 wherein said reaction is initiated by adding a solution of the aluminum chloride to a mixture of the lithium hydride and the sodium hydride in tetrahydrofuran.
7. The method of claim 6 wherein said reaction is conducted under an inert gas atmosphere, and at a temperature from about room temperature to reflux.
8. The method of claim 7 wherein said reaction is conducted substantially at the reflux.

References Cited
UNITED STATES PATENTS 2,920,935   1/1960   Fenholt _____ 23—365

OTHER REFERENCES

Chemical Abstracts, vol. 58, col. 2122 (Feb. 4, 1963).

Zakharkin et al.: "Izvestia, Akademiia Nauk SSSR, Otdelenie Khimicheskikh Nauk," pp. 1146–1149 (July 1962).

MILTON WEISSMAN, *Primary Examiner.*

UNITED STATES PATENT OFFICE
CERTIFICATE OF CORRECTION

Patent No. 3,337,308                      August 22, 1967

Ralph G. Verdieck et al.

It is hereby certified that error appears in the above numbered patent requiring correction and that the said Letters Patent should read as corrected below.

Column 3, line 8, after "lithium" insert -- aluminum --.

Signed and sealed this 1st day of October 1968.

(SEAL)
Attest:

Edward M. Fletcher, Jr.                      EDWARD J. BRENNER
Attesting Officer                             Commissioner of Patents